(12) United States Patent
Bleicken

(10) Patent No.: US 8,789,468 B2
(45) Date of Patent: Jul. 29, 2014

(54) REACTIVE MATERIAL BREACHING DEVICE

(71) Applicant: Eric Bleicken, Portland, ME (US)

(72) Inventor: Eric Bleicken, Portland, ME (US)

(*) Notice: Subject to any disclaimer, the term of this patent is extended or adjusted under 35 U.S.C. 154(b) by 0 days.

(21) Appl. No.: 13/747,596

(22) Filed: Jan. 23, 2013

(65) Prior Publication Data

US 2013/0139715 A1 Jun. 6, 2013

Related U.S. Application Data

(63) Continuation-in-part of application No. 13/495,058, filed on Jun. 13, 2012, now Pat. No. 8,679,399.

(60) Provisional application No. 61/520,593, filed on Jun. 13, 2011.

(51) Int. Cl.

| B23K 7/00 | (2006.01) |
|---|---|
| B23K 23/00 | (2006.01) |
| B23K 20/06 | (2006.01) |
| F42B 3/22 | (2006.01) |
| B23K 7/10 | (2006.01) |
| F41C 9/06 | (2006.01) |

(52) U.S. Cl.
CPC ... *F42B 3/22* (2013.01); *F41C 9/06* (2013.01); *B23K 23/00* (2013.01); *B23K 20/06* (2013.01); *B23K 7/00* (2013.01); *B23K 7/10* (2013.01)
USPC ............ 102/331; 102/364; 102/310; 102/320; 86/50; 266/48; 148/194

(58) Field of Classification Search
USPC ......... 102/311, 312, 314, 317, 320, 331, 335, 102/360, 364, 402, 403, 301, 310, 217; 86/50; 89/1.13, 1.14; 266/53, 71, 76, 266/48; 148/194
See application file for complete search history.

(56) References Cited

U.S. PATENT DOCUMENTS

| 1,531,555 | A | * | 3/1925 | Harris et al. ................... 89/1.14 |
|---|---|---|---|---|
| 2,616,370 | A | * | 11/1952 | Foster ........................... 175/4.53 |
| 3,109,369 | A | * | 11/1963 | Plumley ............................ 86/50 |
| 3,613,581 | A | * | 10/1971 | Pearson et al. ................. 89/1.14 |
| 3,713,636 | A | * | 1/1973 | Helms et al. ..................... 266/71 |
| 3,724,372 | A | * | 4/1973 | Phillips ......................... 102/364 |
| 3,736,878 | A | * | 6/1973 | Guntermann ................. 102/364 |
| 3,741,119 | A | * | 6/1973 | Eckels .......................... 102/310 |
| 3,744,369 | A | * | 7/1973 | Marziano et al. ............. 89/1.14 |
| 3,961,579 | A | * | 6/1976 | Faber et al. ................... 102/364 |
| 4,051,907 | A | * | 10/1977 | Estes ............................ 175/4.55 |
| 4,069,760 | A | * | 1/1978 | Eckels ............................. 299/13 |

(Continued)

*Primary Examiner* — James Bergin
(74) *Attorney, Agent, or Firm* — Caseiro Burke LLC; Chris A. Caseiro

(57) ABSTRACT

A breaching device that may be used to create a linear and, if desired, continuous, cut or breach in a metal structure. The cut or breach created may be non-linear in shape and not deviate from the functionality of the device. The device includes a plurality of containers joined together, such as by a metal wire or the like to form a series of cutting charges. One or more of the containers includes Reactive Material (RM) that may be ignited electronically or some other activation mechanism. The containers that do contain RM are sealed with the RM therein and preferably fabricated to be sufficiently heat resistant so that the RM is only ignited intentionally. The RM that is contained in the containers may be fired simultaneously, sequentially or in a programmed pattern, depending on the requirements of the application.

7 Claims, 10 Drawing Sheets

(56) References Cited

U.S. PATENT DOCUMENTS

| | | | |
|---|---|---|---|
| 4,216,721 A * | 8/1980 | Marziano et al. | 102/306 |
| H464 H * | 5/1988 | Lee et al. | 102/364 |
| 4,815,384 A * | 3/1989 | Ringel et al. | 102/307 |
| H865 H * | 1/1991 | Sery et al. | 102/306 |
| 5,377,594 A * | 1/1995 | Alford | 102/308 |
| 5,524,546 A * | 6/1996 | Rozner et al. | 102/303 |
| 5,936,184 A * | 8/1999 | Majerus et al. | 89/1.13 |
| 6,183,569 B1 * | 2/2001 | Mohler | 148/194 |
| 6,766,744 B1 * | 7/2004 | Song et al. | 102/364 |
| 6,805,832 B2 * | 10/2004 | Mohler et al. | 266/48 |
| 6,979,758 B2 * | 12/2005 | Eidelman et al. | 588/403 |
| 7,331,268 B1 * | 2/2008 | Pangilinan et al. | 86/50 |
| 7,501,551 B2 * | 3/2009 | Eidelman et al. | 588/403 |
| 7,555,986 B2 * | 7/2009 | Givens et al. | 102/331 |
| 7,603,938 B2 * | 10/2009 | Metcalfe | 89/1.14 |
| 7,694,627 B2 * | 4/2010 | Koekemoer et al. | 102/217 |
| 2012/0313299 A1 * | 12/2012 | Bleicken et al. | 266/48 |
| 2013/0139715 A1 * | 6/2013 | Bleicken | 102/311 |

* cited by examiner

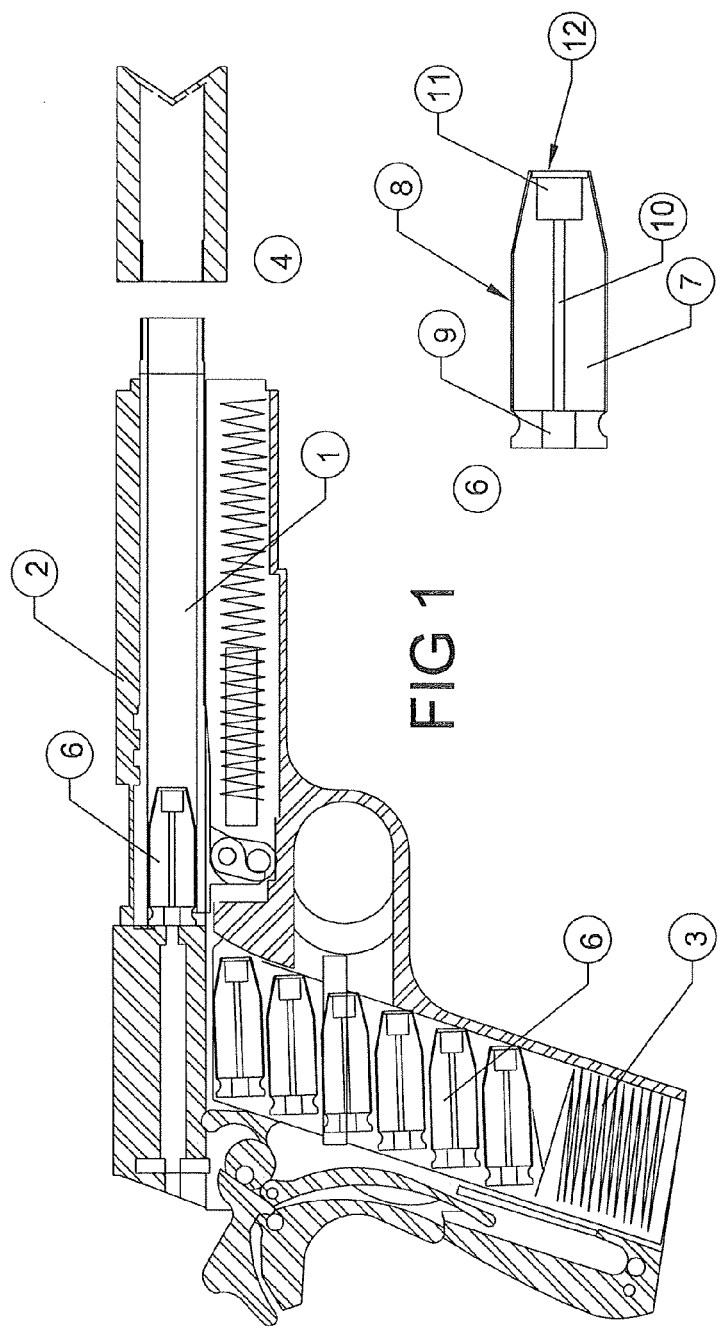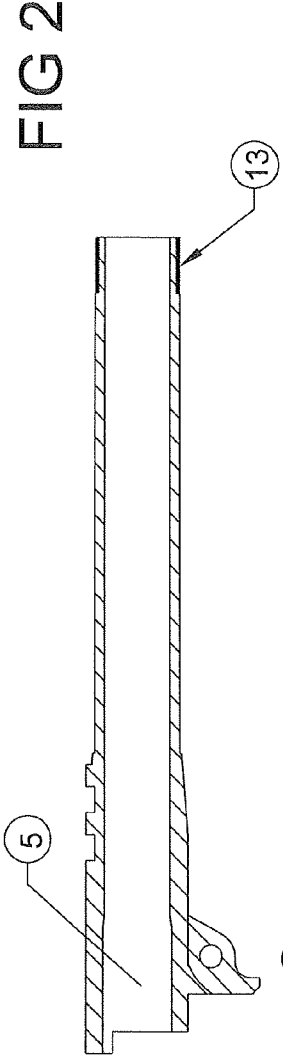
FIG 1
FIG 2
FIG 3

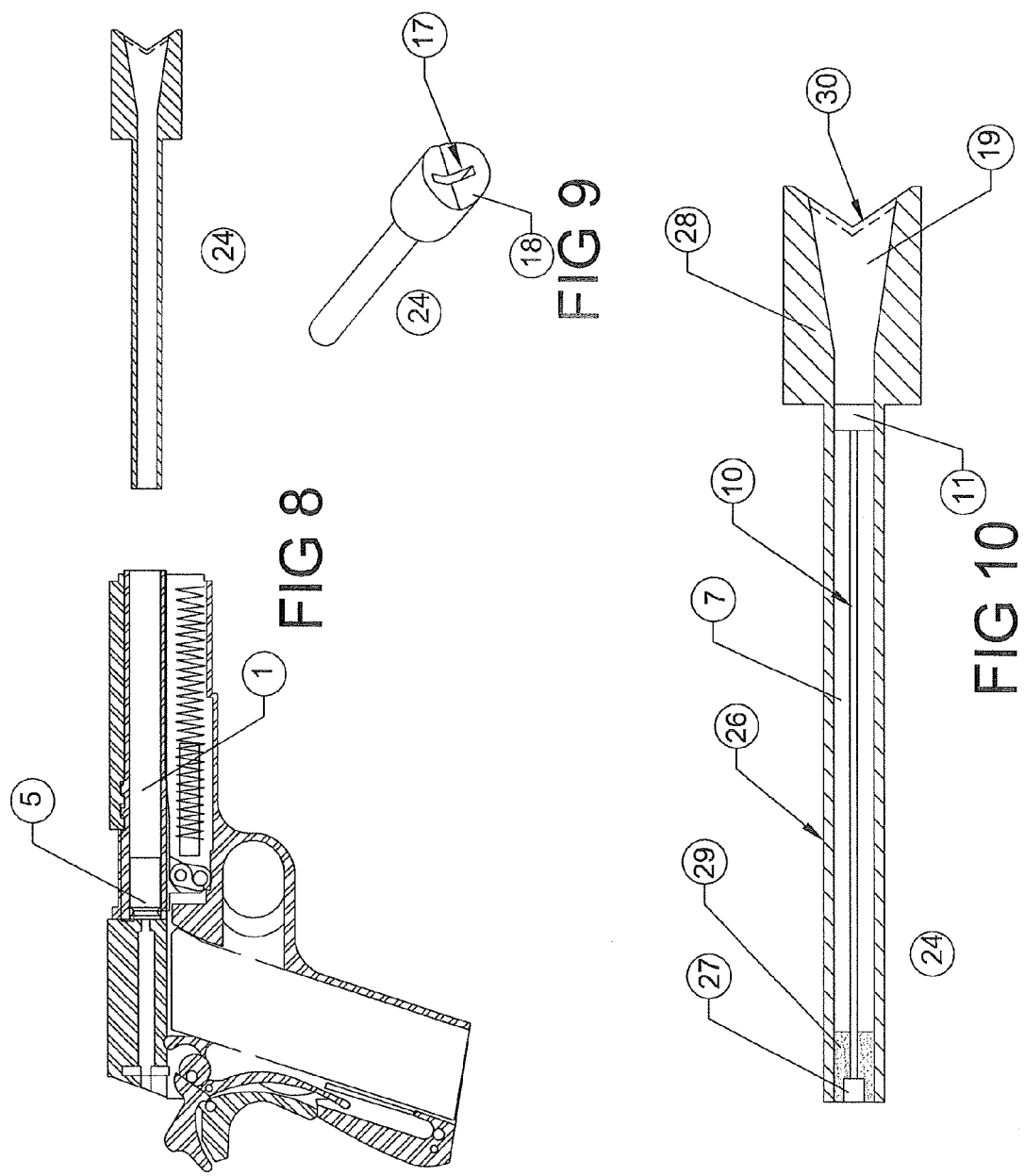

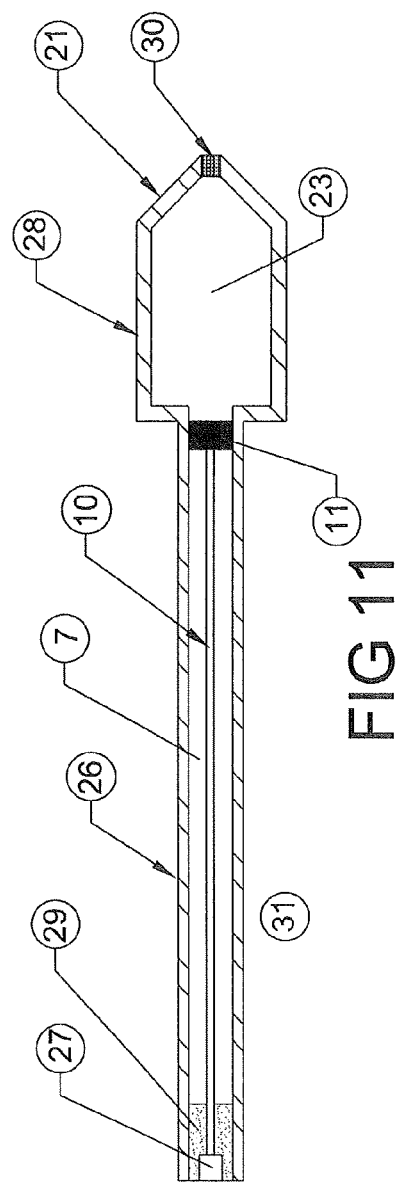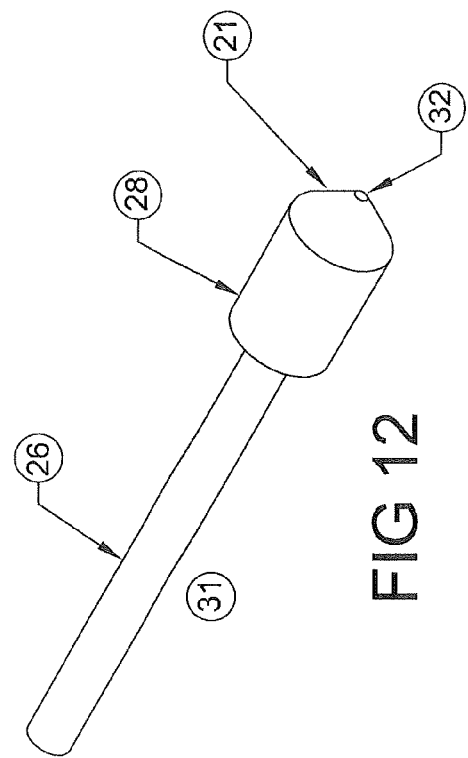

REACTIVE MATERIAL BREACHING DEVICE

CROSS-REFERENCE TO RELATED APPLICATION

This application is a continuation-in-part and claims the priority benefit of U.S. patent application Ser. No. 13/495,058 filed Jun. 13, 2012, entitled "APPARATUS FOR METAL CUTTING AND WELDING" having a common inventor thereof, which pending application is a nonprovisional and claims the priority benefit of U.S. provisional patent application Ser. No. 61/520,593, filed Jun. 13, 2011, entitled "METAL CUTTING/TRACK WELDING KIT FOR SERVICE SIDEARM OR OTHER GUN." The entire content of the priority applications is incorporated herein by reference.

BACKGROUND OF THE INVENTION (1) Field of the Invention

This invention relates to devices for cutting metal. More particularly, this invention relates to devices for cutting metal using reactive materials.

(2) Description of the Prior Art

Military, law enforcement, and emergency response personnel have a longstanding need for breaching locks, doors and other devices to allow access to closed areas and spaces in time sensitive situations. Similarly, these same communities and other officials who carry guns require a means to instantly tack weld things to metal objects in air or underwater such as bridge abutments, radio towers, ships hulls and other targets.

To be able to instantly perform these tasks underwater, as well as in air, is an enormous benefit, especially in covert and clandestine military operations. These breaching/tack welding devices will greatly increase the probability of mission success and operator safety while reducing the size, weight and time necessary to perform these various purposes, as compared to any system or device currently in use.

Traditionally, electric and gas welding systems have been used for these purposes but are not usually carried into combat, law enforcement, or first responder situations; and must be acquired after a critical circumstance has been neutralized. Additionally, a number of explosive and incendiary devices have been developed that will penetrate and/or weld like and unlike metal; nonetheless, these specialized systems must be planned for in advance, in order to have them available when needed. No prior art exists to convert or develop standard service guns that will accurately and reliably fire normal ammunitions as well as provide the added capabilities of cutting and tack-welding metals: the unique purpose of this invention.

Recent research and development of high power density, chemically reactive materials now make possible its packaging in a manner feasible for use in service weapons for this purpose. Some potentially related systems are explosively driven systems that are of limited value in clandestine or covert operations where minimal noise is critical and explosives create a variety of logistical and operational limitations in both foreign and domestic situations. U.S. Pat. No. 3,724,372 describes the concept of an incendiary device. It is a stand-alone device for defeating Improvised Explosive Devices (IED) and other purposes. It does not encompass the concept of modifying a standard service gun for the purposes of breaching and tack welding metals. Therefore the tactical advantages of the proposed invention are not realized. In a manner, the indicated reference describes a different means of containing and delivering Reactive Materials (RM).

What is needed is a device that enables cutting and/or welding in a clandestine manner in a variety of operating environments including, but not limited to, underwater.

BRIEF SUMMARY OF THE INVENTION

The present invention is a device that enables cutting and/or welding in a clandestine manner in a variety of operating environments including, but not limited to, underwater. The device converts a handgun or other weapon for the purposes of cutting and tack-welding metals. Multiple embodiments are described but the invention is not limited specifically to these embodiments. Some embodiments include the use of a Reactive Material (RM), which is a thermite composition including a metallic powder and an oxidizer which, when ignited, produces an exothermic oxidation-reduction reaction. Examples of RM suitable for the purpose of using the device of the present invention include, but are not limited to mixtures of aluminum and iron oxide or aluminum plus copper oxide. The RM is contained in a containment device, such as a cartridge.

Other embodiments, while useful for RM, improve the firearm itself. The first embodiment is a cartridge that is fed into the breech from the gun's magazine or clip when the muzzle is temporarily fitted with a cutting or welding nozzle. In this case, the gun's breech, barrel and detachable nozzle should be manufactured from heat resistant material such as ceramic, or at least its bore may be fabricated of such material, including the option of using a composite, and/or a ceramic-composite combination, provided such material is either or both of refractory and insulative (at least in comparison to metal).

The second embodiment is a muzzle-loaded sleeve with a fixed end nozzle that slides inside the gun barrel and is ignited by pulling the trigger and causing the hammer to strike the cap that is located in the breech. Because of the extremely high temperature associated with RM, traditional steel gun barrels cannot be exposed to the burning process; therefore, in the second embodiment the muzzle-loaded sleeve should be made from a material (such as ceramic, composite and/or ceramic-composite material, or at least its bore may be fabricated of such material, including the option of using a composite, and/or a ceramic-composite combination) that can withstand the extremely high temperatures generated by the RM. In both embodiments, the weapon may still be able to function as a normal gun before and after using it for the purpose of cutting or spot welding metal. It is also to be noted that the adaptive muzzle of the present invention may be used with some other sort of tool not limited to a gun, wherein the adaptive muzzle includes an adaptive nozzle and a tube affixed to the nozzle, wherein the tube includes the reactive material therein and includes means for igniting the reactive material for passage through the adaptive nozzle. The tool to enable the directed passage of the ignited reactive material to a desired location may be a gun barrel but is not limited thereto.

The present invention is also a breaching device that may be used to create a linear and, if desired, continuous, cut or breach in a metal structure. The cut or breach created may be non-linear in shape and not deviate from the functionality of the device. The device includes a plurality of containers joined together, such as by a metal wire or the like to form a series of cutting charges. One or more of the containers includes Reactive Material (RM) that may be ignited electronically or some other activation mechanism. The containers that do contain RM are sealed with the RM therein and preferably fabricated to be sufficiently heat resistant so that the RM is only ignited intentionally. The RM that is contained in the containers may be fired simultaneously, sequentially or in a programmed pattern, depending on the requirements of the application. The breaching device may be used to control the breaching of a structure under a wide range of conditions. For example, conventional explosive "linear shaped charges" that exist for underwater and above water breaching can be used to open a substrate, these existing devices must be activated remotely so as to prevent harm to any person operating it. They can also be unwieldy and difficult to apply on other than flat surfaces. The present invention, on the other hand, is manageable under different conditions and the operator can be close at hand to activate it as the energy generated with the device is substantially completely directed to the substrate to be breached and the possibility of an adverse condition resulting from a shock wave, for example, is minimized. This and other advantages of the present invention will become more apparent upon review of the following detailed description, the attached drawings and the appended claims.

BRIEF DESCRIPTION OF THE DRAWINGS

FIG. 1 is a cross sectional, side elevation of a first embodiment of the device of the present invention including a gun loaded with RM cartridges and a cutting nozzle that attaches to the muzzle.

FIG. 2 is a cross sectional, side elevation of an RM cartridge of the invention.

FIG. 3 is a cross sectional side elevation of a gun barrel that may be ceramic or at least include a ceramic bore sleeve.

FIG. 8 is a cross sectional, side view of a second embodiment of the device of the present invention including a gun with a muzzle loaded RM device positioned for inserting into the gun barrel.

FIG. 9 is a perspective view of the muzzle loaded RM device of FIG. 8.

FIG. 10 is a cross sectional, side elevation of a muzzle loaded RM device of the invention.

FIG. 11 is a cross sectional view of a muzzle loaded RM tack-welding device of the invention.

FIG. 12 is a perspective view of a muzzle loaded RM tack-welding device of the invention.

DETAILED DESCRIPTION OF PREFERRED EMBODIMENTS OF THE INVENTION

Figure 5:
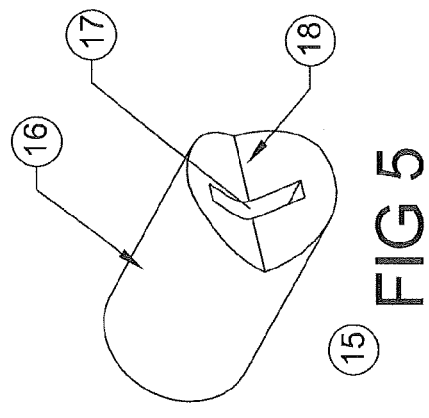
FIG. 5 is a perspective view of a detachable cutting nozzle.

A first embodiment of a cutting/welding device of the present invention is shown in FIG. 1 as a gun. The gun of the first embodiment and/or components and variants of components thereof are shown in FIGS. 1-7 and include a heat resistant barrel 1, a slide 2, a magazine 3, a removable nozzle attachment 4, a breech 5, one or more cartridges containing Reactive Material (RM) cartridge 6, RM 7, a RM cartridge casing 8, a primer 9, a hollow flame tube 10, a RM ignition initiator 11, a seal 12, an optional male nozzle mount 13, an optional female nozzle mount 14, a detachable cutting nozzle 15, a cylinder body 16, a slot opening 17, a front face 18, a portal 19 that may be slot-shaped or other configuration, and a detachable tack-welding nozzle 20.

The barrel 1 may duplicate, in general form, existing barrels used in weapons currently in service or it may be a new gun barrel design to accommodate increased dimensions to the sidewall of the barrel 1, changes in weight that might affect the semi-automatic function of the gun and/or other mechanical issues. Additionally, the interior surface of the gun barrel 1 may include polygonal rifling rather than lands and grooves, or such other form of rifling as described herein. For illustration purposes only, the gun represented in FIG. 1 is government model 1911-A1 45 cal. semi-automatic service weapon with modified or modifiable gun barrel 1 but the invention is not limited to that specific gun type or model. Other barrel forms are possible with the present invention, including those having non-round shape including, but not limited to, polygonal shapes. The same can be said for the other tube and nozzle tool components described herein.

There is a means to temporarily attach to the gun barrel 1 one or more nozzles 13 used for cutting and tack-welding. This "means" may be a dogging device, threads or some other locking mechanism. The barrel 1 is composed of heat resistant ceramic and/or composite materials that can withstand repeated, extremely high temperatures and rapid temperature fluctuations. The entirety of the barrel 1 may be made of ceramic or such other material, or at least its bore may be fabricated of such material. Semi-automatic handguns are the most likely weapon to be configured for the dual purpose of shooting projectiles as well as cutting and tack-welding. Because the breech 5 is contiguous to the barrel 1, no leakage of RM during ignition will occur: a problem that would likely happen with a revolver. Nonetheless, a semi-automatic gun that normally chambers the next round is not expected to semi-automatically feed RM cartridges 6 because there will be insufficient blow-back pressure. Each cartridge 6 may be manually fed using the gun's slide 2 to insert another round from the magazine 3.

The RM cartridge casing 8 shown in FIG. 2, is similar in size and dimensions to a fully loaded gun round to include the projectile containing RM 7 in order to maximize the amount of RM 7 contained in the cartridge 8. However, other dimensions and sizes of the RM cartridge casing 8 are contemplated and may require a change in the dimensions of the gun barrel 1. The primer 9, normal to a center fire round, detonates into the hollow flame tube 1) on impact with the gun's hammer. The flame tube 10 extends longitudinally through the center of the RM 7 to prevent ignition of the RM 7 along its path. The detonation extends to the RM initiator 11 that in turn ignites the RM 7 from the front of the cartridge casing 8. The resulting high temperature abrasive flame burns into the gun barrel 1 and out through the detachable cutting 15 or the detachable tack-welding 20 nozzle.

The cutting nozzle 15 is mechanically attached to the gun barrel with a dogging system or some other means and is used only with RM cartridges 6 designed for cutting metal. The nozzle 13/14 is composed of a robust material that can tolerate extremely high temperatures. The material may be a ceramic material, such as a composite-reinforced ceramic. The nozzle 13/14 may be fabricated completely of such material, or it may include at least a bore made of such material. The outer shape of the cutting nozzle 15 is the cylindrical body 16 to differentiate it from the tack-welding nozzle 20 and the front face 18 of the cutting nozzle 16 is concave or V shaped. The slot opening 17 extends through the center and at 90° to the V-shaped or curved front face 18. This embodiment allows for easily centering and holding the nozzle 18 over a rod or bar stock to be breached. Any sort of focusing configuration of the portal 19 can be of benefit in modifying the velocity of the output of the RM 7.

The detachable tack-welding nozzle 20 attaches to the gun barrel 1 in the same manner as the cutting nozzle 15 with male/female interface 13/14, a dogging system or some other means. Rather than being cylindrical like the cutting nozzle 15, the front of the nozzle 20 includes a focusing pointed end 21 to differentiate it. An internal chamber 23 of the nozzle 20 is designed to form a vortex and there is a round orifice 22 rather than a slot to concentrate burning reactive material for the purpose of tack-welding.

It is contemplated that selectable configurations of the RM cartridges 6 may be created and employed as a function of whether a fast or a slow (quiet) burn is preferred. Each cartridge form may require a certain form of the barrel 1 and/or either or both of the cutting nozzle 15 and the tack welding nozzle 20. They may further be configured with a unique shape to aid with identification when operational visibility is limited. Standard magazines 3 may also be modified so that a nozzle can be fixed to it when RM rounds are not in use in order to have the correct nozzle available when needed. In addition, a specific rotation of the RM gasses may assist in the kinetics of the RM function for vortex control.

A second embodiment of a cutting/welding device of the present invention is shown in FIG. 8 as a gun. The gun and/or components and variants of components thereof are shown in FIGS. 8-12 and include the gun barrel 1, the breech 5, a muzzle loading cutting component 24, a heat resistant tube 26, an impact-initiated primer 27, a cutting nozzle 28, an inert breech plug 29, a nozzle plug 30, which may be frangible or ablative, a muzzle loading tack welding device 31, the RM 7, the hollow flame tube 10, the RM ignition initiator 11, the slot opening 17 for the cutting component 24, and the pointed end 21 and the internal chamber 23 for the muzzle loading tack welding device 31.

The heat resistant tube 26 is configured to extend substantially the entire length of the gun barrel 1 and extending through the breech 5, is fitted with a center fire primer 27 or impact initiated electronic device at the point where the gun's hammer can ignite the device corresponding in that manner to the operation of the gun of FIG. 1. The internal flame tube 10 or other energy propagating mechanism that runs the length of the RM 7 contained in the tube 26 provides a flame source to the RM initiator 11 causing the RM 7 to ignite at the muzzle end of the device. Extending beyond the barrel 1 is a nozzle 28 that is affixed to the heat resistant tube 26 and is also made from heat resistant material.

This second embodiment does not offer the convenience of rapidly firing a series of incendiary rounds or the convenience of being stored and available in a standard gun magazine as is provided by the embodiment of FIGS. 1-7. Nonetheless, it does provide far greater cutting and tack-welding energy given the greater volume of RM 7. It may be used in a standard steel gun barrel or with a ceramic barrel or a barrel including a ceramic bore, such as an interior ceramic sleeve, or other material that is more refractory and/or insulative than metal and capable of operation under the temperatures to be expected when using RM. The nozzle 28 is provided that is specifically configured for a particular purpose and the RM contained therein is also formulated for that purpose. As a result, the device 24 may be a one-time use device.

This muzzle-loaded embodiment may be held in place at the muzzle of the barrel 1 by friction, magnet or some other means. It may also be used with a ceramic gun barrel, or barrel with a ceramic bore, that can utilize the magazine fed RM cartridges 6. The section of the tube 26 that extends into the breech 5 may require additional thickness or may optionally be the inert plug 29 to prevent splaying of the device 24 in the breech 5 during ignition that might prevent easy extraction following its use.

As seen in FIG. 10, the tube 26 is elongate with the nozzle 28 affixed thereto. The end of the device 24 that extends into the breech is provided with the primer 27 that is exploded into the flame tube 10 that extends longitudinally through the center of the device 24 and prevents the ignition of the surrounding RM 7. At the muzzle end of the device 24, and behind the cutting nozzle 28 is the RM Initiator 11 that activates the RM 7. As described in the first embodiment above, the nozzle 28 has a cylindrical outer shape with the V shaped or concave front face 18 with the slot 17 situated 90° through the center of the face 18. The slot 17 may be plugged with plug 30, which may be a frangible or ablative material to protect the interior of the device 24 from environmental hazards during storage.

Like the previously described embodiment, the cutting nozzle 28 may have a slotted or some other configuration designed to increase the cutting efficiency of the torch established upon ignition of the RM 7.

Figure 7:
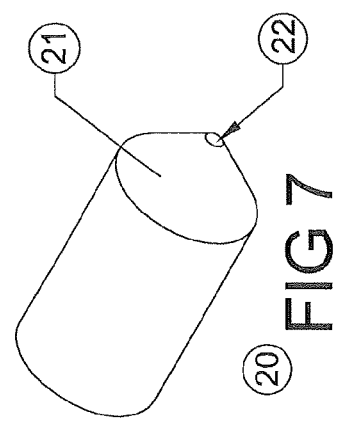
FIG. 7 is a perspective view of a detachable tack-welding nozzle.
Figure 4:
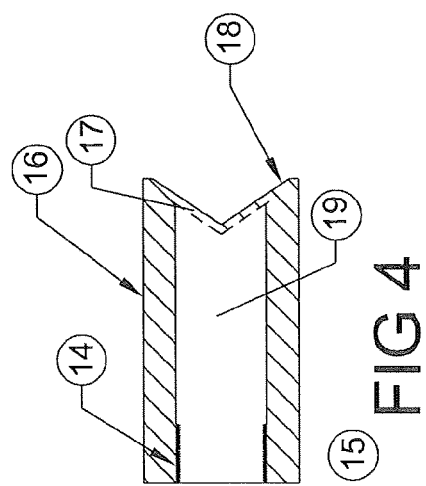
FIG. 4 is a cross sectional, side elevation of a detachable cutting nozzle.
Figure 6:
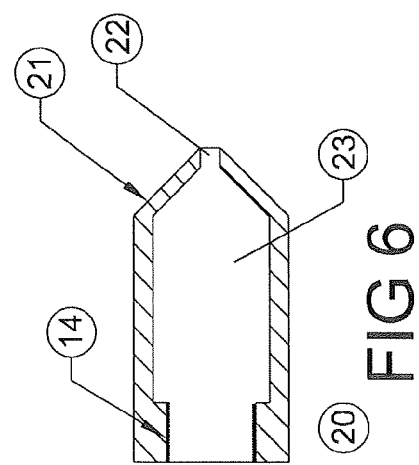
FIG. 6 is a cross sectional, side elevation of a tack-welding nozzle.

The muzzle loaded tack-welding device 31 shown in FIGS. 11 and 12 is substantially the same in configuration as the tack welding nozzle of FIGS. 6 and 7 except that it is affixed to the tube 26 and insertable in a single unit into the muzzle of the barrel 1. The nozzle 31 includes a round orifice 32 and the internal chamber 32 that causes the expanding RM plasma to form a vortex in order to maximize the welding properties of the device 24. However, the RM formula may be substantially different than that used for cutting metals.

Figure 13:
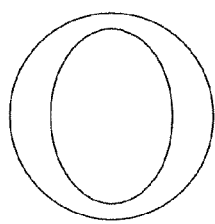
FIG. 13 is a cross sectional view of the bore of the barrel of the present invention showing in exaggerated view the oval rifling option.
Figure 14:
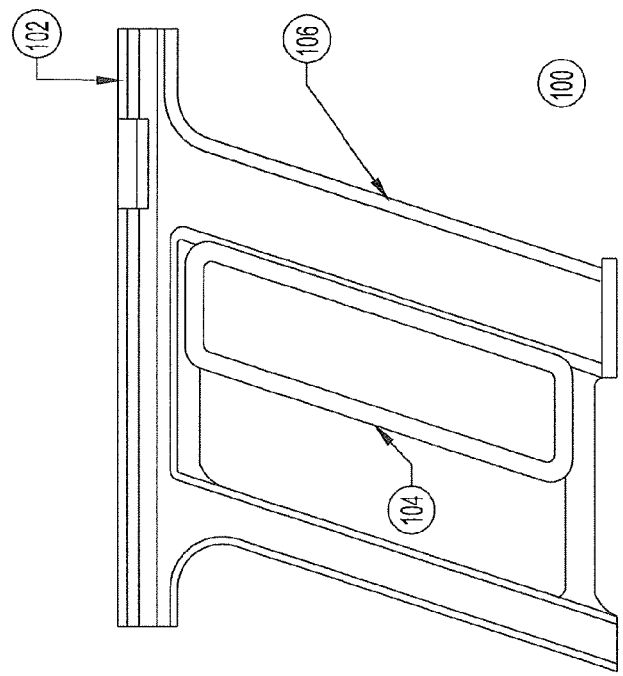
FIG. 14 is a side view of a clip portion of a tool for containing the RM and also showing a portion of a barrel of the tool.
Figure 15:
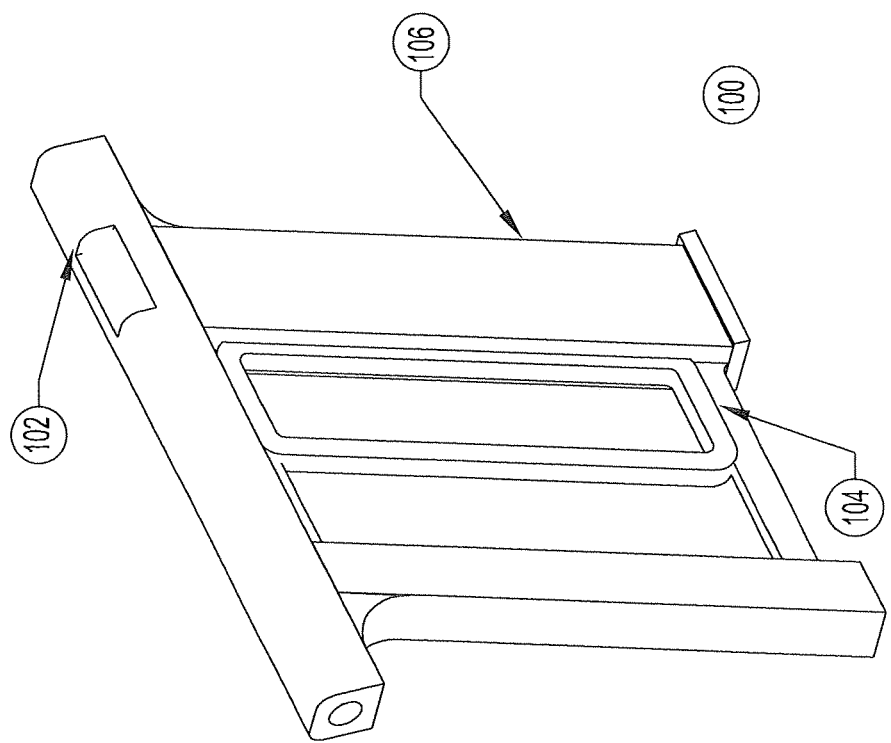
FIG. 15 is a perspective view of the portion of the tool as shown in FIG. 14.
Figure 16:
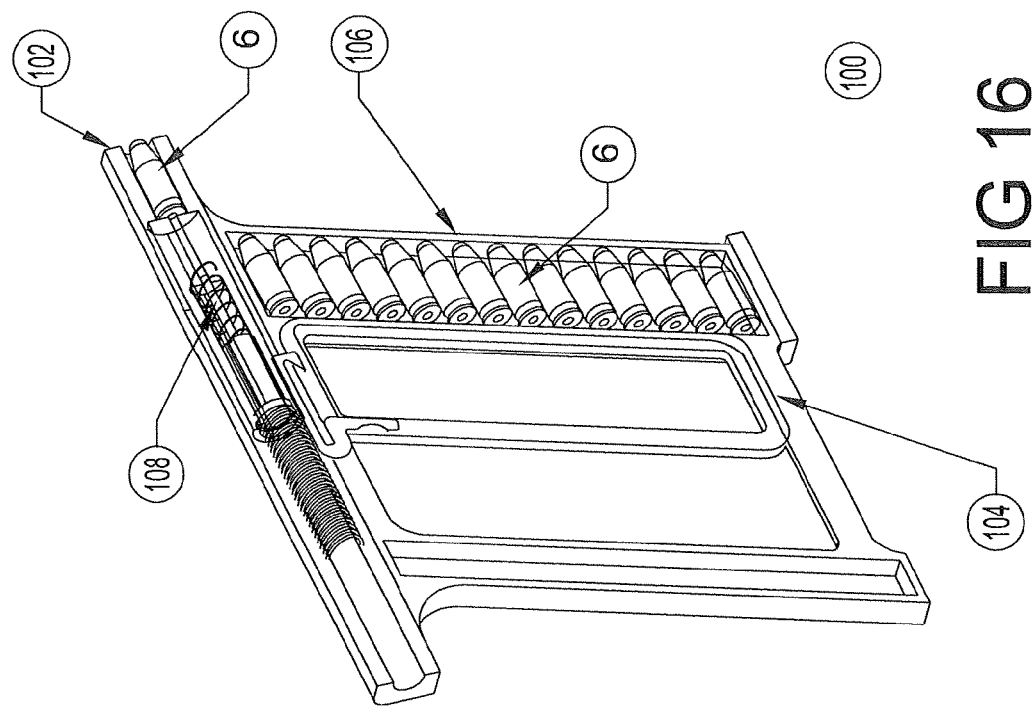
FIG. 16 is a partial cut away perspective view of the tool of FIG. 14 showing the RM cartridges in the clip.
Figure 17:
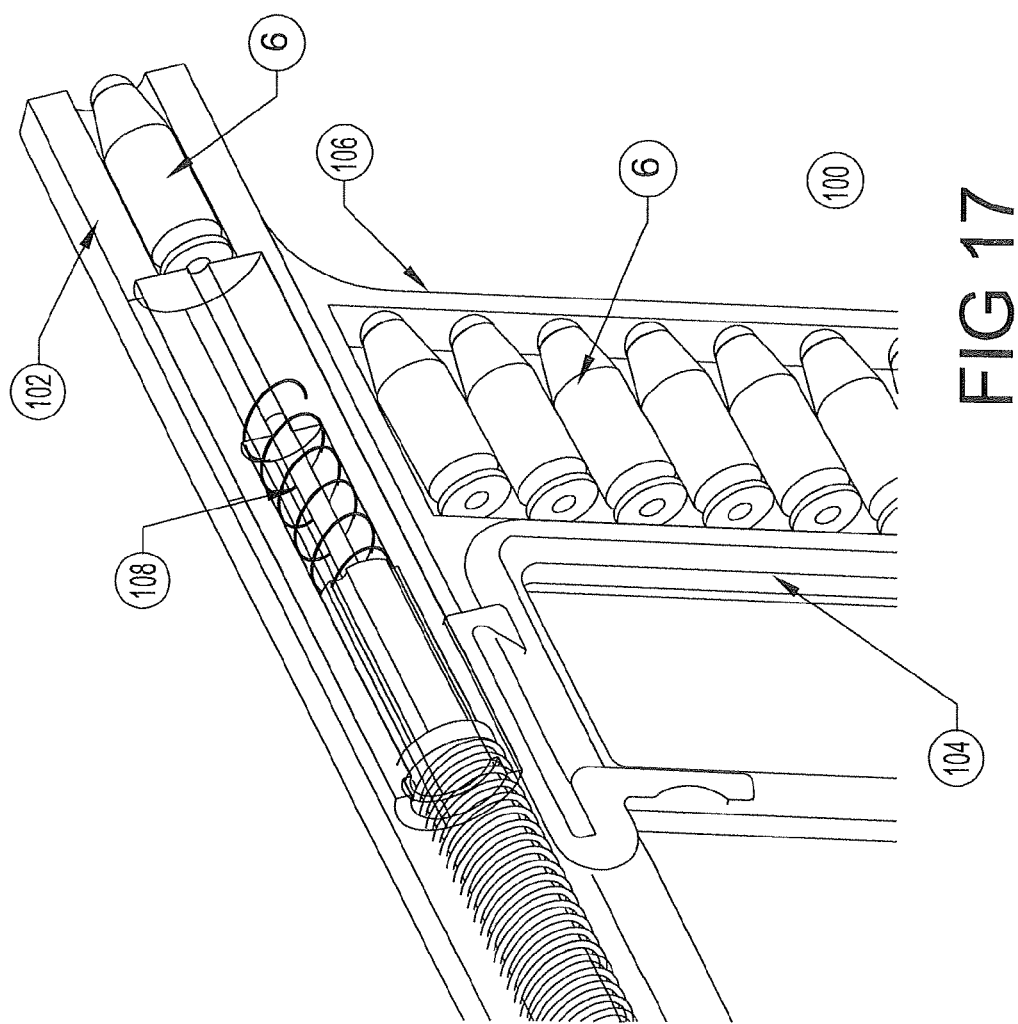
FIG. 17 is a close-up partial cut away perspective view of the tool of FIG. 14 showing the RM cartridges in the clip.

An additional enhancement of the present invention to increase the effectiveness of the tool and/or the functioning of the RM 7 includes a reduction of stress concentrations in the bore while still providing rifling that imparts spin to the projectile existing the barrel. An example of such stress concentration rifling is an oval rifling configuration in the bore, as represented in FIG. 13. The oval rifling circumscribes the interior of the barrel. Most conventional rifling that exists in the interior of gun barrels includes alternating lands and grooves wherein the lands and grooves have sharp vertices that score the projectile substantially. The rifling imparts spin to the round as it passes through the barrel. That spin enables better maintenance of the line of travel of the projectile beyond the muzzle. It also stresses the bore of the barrel as sharp vertices are stress concentrators.

The interior of the barrel of the present invention may optionally be configured to minimize stress concentration sites in the bore. In particular, the interior of the barrel is configured with rotating (i.e., circumscribing) oval-shaped rifling, which imparts the force to the projectile that causes it to rotate as it departs the muzzle. That is, the barrel includes a helical bore comprising an oval cross section wherein the lands represent the minima of the oval and the grooves represent the maxima of the oval. When the barrel and/or nozzle of the tool of the present invention is fabricated of a nonmetallic material such as a ceramic or a composite-reinforced ceramic, including such a tool with a bore that is fabricated of such material, with a portion or the remainder of the tool fabricated of another material, the elimination of sharp vertices, such as through the use of oval-shaped rifling, minimizes the existence of stress concentrations of the barrel by dispersing stresses evenly around the barrel hoop, thereby reducing the likelihood of causing some form of damage to the barrel upon projectile activation. Further, the oval-shaped rifling limits cutting into the projectile jacket that occurs with conventional rectangular lands and grooves, which cutting may cause drag and uneven spin of the projectile, thereby reducing its accuracy and distance. The oval rifling need only be of sufficient dimension to impart spin to the projectile, which is also enough to enable detection of tool marks for identification purposes, The extent, shape and periodicity of the oval rifling may be selectable as a function of the desired speed and rotation rate for the projectile expelled from the barrel/nozzle, but not so significant as to cause substantial scoring of the projectile jacket.

The present invention also includes the option of providing a barrel including a bore with tailored rifling, whether the barrel is made of ceramic material, composite material or a combination of the two, either for its entirety or a portion thereof including the bore. For example and without intent to be limiting, the bore near the breech may have no rifling, while rifling may be formed between the breech and the muzzle. That rifling may be constant or it may be varied. For example, the rifling may part an initial relatively slow spin to the projectile and then increase the rate of spin as the projectile reaches the muzzle.

The present invention also includes the option of providing in a barrel including at least a ceramic, composite or ceramic-composite bore, one or more electrically conductive components that may be used to create a spark gap. The spark gap may be employed to activate something associated with the projectile. For example, the spark gap may be located near the breech such that when the projectile is actuated, a spark is generated that activates the projectile. This may be useful to regulate activation of a projectile such as one including the RM material, whether provided as a cased or a caseless projectile.

The terminus of the barrel may also be configured with reduced dimensions, and/or the barrel may be tapered for a portion or all of its length, at least at the interior diameter to create a squeeze bore. That configuration minimizes hysteresis of the barrel during projectile passage and may be of particular usefulness when the barrel is fabricated with ceramic or composite-reinforced ceramic, or at least with a bore fabricated of such material. A tapered or reduced inside dimension barrel restricts gas leakage around the perimeter of the projectile as it passes through the barrel. The resultant effect is greater pressure behind the projectile as it exits the barrel so that it may travel farther with the same original energy than is possible with a barrel configured to permit gas to pass around the projectile prior to its exit.

Another tool 100 for retaining and firing RM cartridges 6 is shown in FIGS. 14-17. The tool 100 includes a barrel 102, a trigger 104, a replaceable clip 106 containing the RM cartridges 6 and a spring-loaded striking pin 108. The tool 100 is configured to allow the user to access and fire a plurality of RM cartridges 6. This tool is used solely for the purposes of cutting and tack welding in air and underwater. Because the tool is not a gun and no bullets will be fired from it, there is no requirement for rifling or constricting the barrel. Nevertheless, either or both of these features may optionally be incorporated into the tool to enhance or otherwise change the performance of the RM. The required cutting or tack-welding nozzles may be permanently fixed or detachable, depending on its intended use. A bore material which is either or both of refractory in nature and which has a low thermal conductivity may be used to increase the efficiency of the chemical reactions.

The present invention has been described with attention paid primarily to firearms and handheld-type tools that are not specifically firearms, all with the characteristic of enabling the delivery of RM from such a device to a target, whether for cutting, welding or other purposes. It is noted that the features of the barrel, nozzle, tube or the like described herein as one or more aspects of a handheld device may also be applicable in the delivery of a projectile and in the delivery of the energy of RM from equipment, a tool, or the like that is more stationary in nature. For example, and without intending to be limiting, the features of the delivery system described herein may be embodied in a machine, mounted, or unmounted, for manual control, as well as computer-controlled devices such as CNC machines. At least the bores of such devices and equipment can incorporate the features of including nonmetallic material (ceramics, composites and/or a combination of the two, for example), oval rifling, variability of rifling, tapering and electronic activation options all described herein, to enhance the effectiveness, accuracy and energy associated with a projectile delivered or activated, such as RM. Such devices would be operable more as manufacturing machines with better functionality rather than a firearm with better functionality. It is also to be noted that while the present invention has been described with respect to the removable attachment of the adaptive nozzle to a muzzle of a firearm, it is to be understood that the muzzle may also be that of another type of tool including, for example, the muzzle of a piece of manufacturing equipment. Therefore, the terms "muzzle" and "barrel" are to be construed broadly and not limited to the muzzle or barrel of a firearm.

Figure 18:
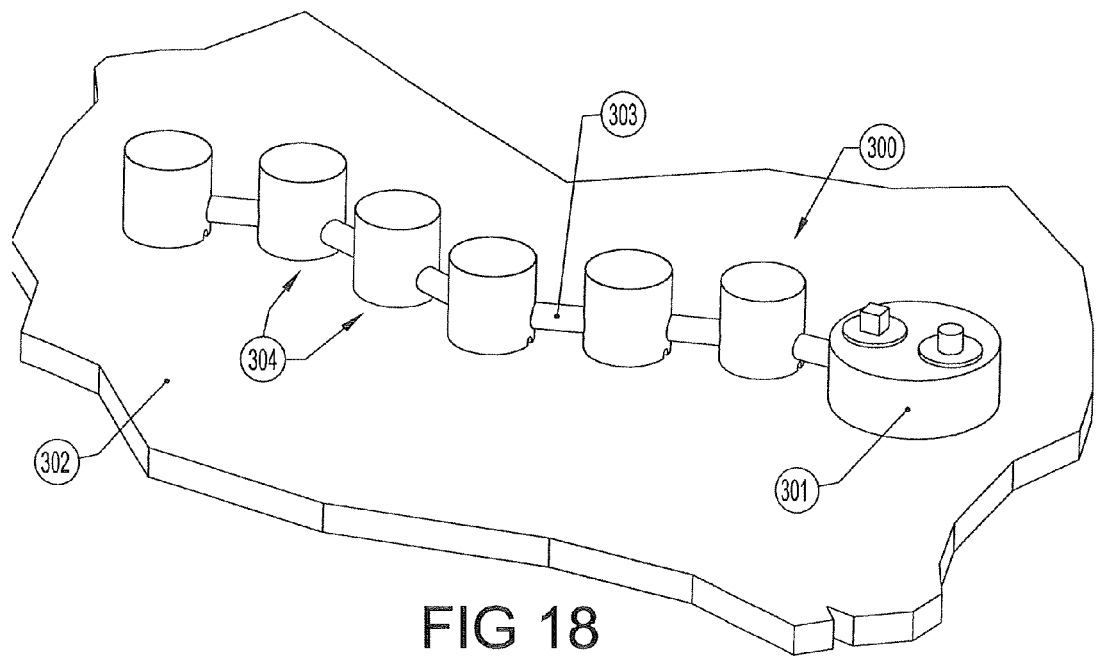
FIG. 18 is a perspective representation of a breaching device of the present invention on a substrate.

The present invention further includes a linear breaching device, an example of which is shown in FIG. 18, as breaching device 300. The breaching device 300 is referred to as a linear device in that it may be used to create a linear and, if desired, continuous, cut or breach in a metal structure, such as substrate 302. It is to be understood, however, that the cut or breach created may be non-linear in shape and not deviate from the functionality of the device 300. Moreover, in addition to optionally generating a non-linear breach, the breaching device 300 may be used on uneven and not flat surface including, for example, curved surfaces, but not limited thereto. The device 300 includes a plurality of containers 304 joined together, such as by a connecting harness 303 that may be formed of a metal wire or the like to form a series of cutting charges. The connecting harness 303 is preferably formed of a material and with a configuration to be of sufficient flexibility to enable a user to apply the breaching device on an uneven surface, across different substrates or in other not completely flat and/or not completely linear arrangements while having the structural integrity to keep the containers 304 joined together. In that way, the breaching device 300 may be used in a range of situations not limited to straight and flat. One or more of the containers 304 includes RM that may be ignited electronically or through ignition control mechanism 301. Each container 304 includes a casing of sufficient structural integrity to contain RM sealed therein and preferably fabricated to be sufficiently heat resistant so that the RM is only ignited intentionally and the resultant flame is only transmitted through a portal located in a selectable position, which may be at or near the substrate 302 where a breach is desired.

The RM that is contained in the containers 304 may be fired simultaneously, sequentially or in a programmed pattern, depending on the requirements of the application. There is no need to use a flame tube to ignite the RM in the containers 304. Instead, the RM in each of the containers 304 is ignited directly by RM igniter 308 positioned in first portal 307. The RM igniter 308 may be an electric match such as, for example, the J-Tek Electric Match available from MJG Technologies of Blenheim, N.J., or a chemical delay system similar to those used in millisecond delay electric blasting caps, that is activated by the ignition control mechanism 301 rather than an impact ignited cartridge primer normally found in center fire rounds used in side arms and rifles. The ignition control mechanism 301 generates a spark at the RM igniter 308 that in turn ignites the RM from the front of the inside chamber where the RM is contained. The resulting high temperature abrasive flame generated passes through the first portal 307 into the chamber 309 and out of the container 304 of a second portal 310 or nozzle.

The device 300 may alternatively be activated through a hard wire connected to a cap blasting device, such as a Twist Type 10 cap blasting device available from Blasters Tool and Supply Company of Lawrenceburg, Ky., triggered with a timing mechanism or fired remotely such as with a 1664 Remote Blasting System also available from Blasters Tool and Supply Company, in the same manner that explosives are normally detonated in a commercial setting. The breaching device 300 may be attached to a metal target such as the substrate 302 magnetically or by other means, such as adhesive or welding if the substrate 302 is not conducive to magnetic attachment. The containers 304 may be sized and shaped in a selectable way dependent on the function of the device 300. The device 300 includes, but does not have to include, an ignition control mechanism 305 attached to the set of containers 304. The ignition control mechanism 305 may be attached to the substrate 302 in the same manner as that of the containers 304.

In the case of military operations, the ignition control mechanism 301 may require government classified arming and ignition systems currently used to detonate explosives during military training and combat operations. These may include a keyed series of sound frequencies for underwater applications or LASER light or another kind of signal in air. An integrated battery-powered device that provides a way to select and control the ignition of the containers 304, the sequence of ignition of the individual containers 304 and the timing of the selected sequence. These settings can be selected by the operator using the device 300 at the location of intended use and provide a way to prevent an unauthorized party from overriding the operator-selected ignition program once it has been initiated. The ignition control mechanism 305 may be contained in a waterproof and/or shockproof housing and shielded from static electricity or electromagnetic influences that could result in the unintended ignition or intended ignition failure of the device 300.

The ignition control mechanism 301 may be programmed to ignite the RM in one or more of the containers 304. It may be programmed to ignite the RM in the containers 304 simultaneously, sequentially or in a preselected pattern. The ignition itself may be initiated remotely, through a set timer or manually. The ignition may be initiated so that the RM in the device 300 is fired by time delay, predetermined time, controlled ignition (that is hard wired), and remotely, such as by keyed sequence of sound frequencies or optical frequencies for use in water and in the air.

Figure 19:
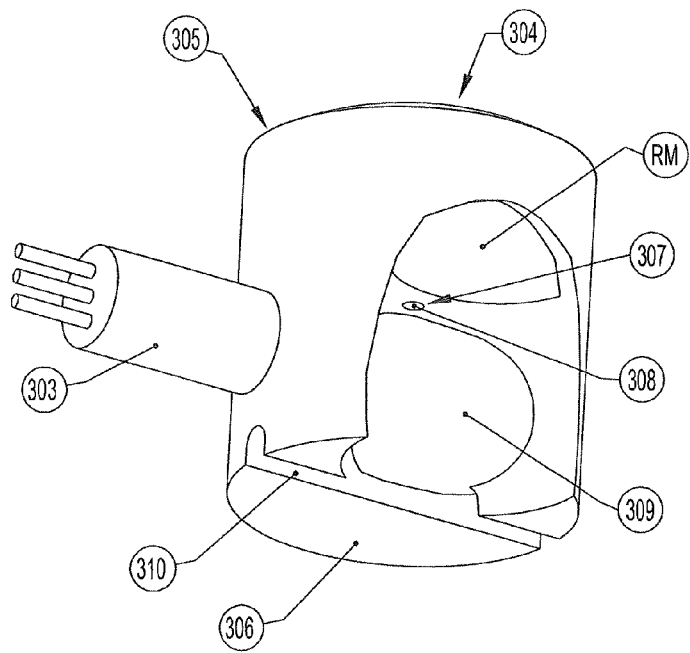
FIG. 19 is a perspective view looking from below at a container of the breaching device shown in partial cutaway.
Figure 20:
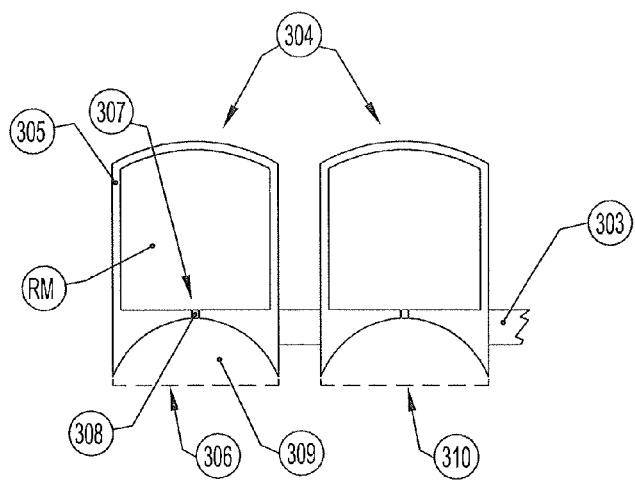
FIG. 20 is cross sectional side view of a pair of containers of the breaching device of the present invention joined together with the cross section aligned with the second portal of the containers.
Figure 21:
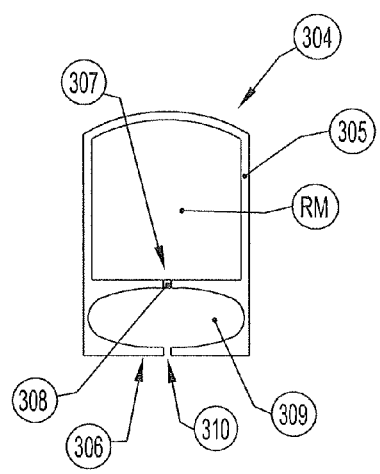
FIG. 21 is a cross sectional side view of a container of the breaching device of the present invention showing the container oriented 90° to the orientation of the containers of FIG. 20.

As shown in FIGS. 19-21, the container 304 includes a contact end 306 that interfaces with the substrate 302 when the device is positioned where cutting is desired. The RM is ignited at or near the first portal 307 by the RM igniter 308. The burning RM expands through the first portal 307 and into expansion chamber 309 to output the ignited RM energy in a pattern defined by the shape of second portal 310. The second portal 310 is shown in the drawings as slotted; however, it may be round or of other desired configuration. A slotted configuration facilitates a linear cut. The slot may be extended upwardly along the sidewall of the contact end 306 in order to overlap flames of adjacent ones of the containers 304 and thereby prevent gaps in the breaching of the substrate. Where perforations are needed, rather than a continuous linear cut, then the second portal 310 may be a round hole and the containers 304 can be placed at intervals that will fit a particular requirement. An example of such an application is a down-hole firing device used to perforate the steel casing of an oil well. These devices are currently explosive shape charges.

The container 304, or at least all or a portion of the contact end 306, may be fabricated of a magnetic ceramic material or other materials of the type described herein. The contact ends 306 of a plurality of containers 304 joined together to form the device 300 may be aligned and configured in order to allow burning RM exiting therefrom onto the substrate 302 in a selectable pattern including, but not limited to, an overlapping pattern so that there are no gaps in the burning of the substrate 302 where desired. The device 300 may be configured in all manner of forms with various container and portal patterns to create breaches of the substrate 302 in any pattern of interest.

The device of the present invention provides for effective breaching, cutting and/or welding under a range of conditions (in air or underwater) with a device that is portable and more manageable under a wide range of operating environments than is available with existing cutting/welding tools and systems. These advantages are provided in the example embodiments of the invention described and shown, as well as with other embodiments incorporating the features described herein. The invention is not limited to the specific arrangements and example described herein. It is to be understood that the invention includes all reasonable equivalents.

What is claimed is:

1. A device for cutting metal, the device comprising a plurality of containers joined together by a connecting harness and attachable to a substrate to be breached, wherein at least one of the plurality of containers includes an ignition control mechanism and wherein a remainder of the plurality of containers each includes reactive material and a reactive material igniter coupled to the ignition control mechanism, wherein the remainder of the plurality of containers including reactive material includes a contact end with a portal configured for directing the firing of the reactive material to the substrate when the device is attached to the substrate and when the reactive material is ignited by the reactive material igniter, and wherein the remainder of the plurality of containers including reactive material are formed of sufficient structural integrity to contain the reactive material sealed therein and sufficiently heat resistant so that a flame resulting from ignition of the reactive material is only transmitted through the portal, wherein the remainder of the plurality of containers including the reactive are arranged with respect to one another so that the flame of the ignited reactive material exiting from their respective portals overlaps.

2. The device of claim 1, wherein the portal is slotted.

3. The device of claim 1, wherein the remainder of the plurality of containers including the reactive material is fabricated of a magnetic ceramic material.

4. The device of claim 1, wherein the plurality of containers are arranged on the substrate in a selectable pattern.

5. The device of claim 1, wherein the remainder of the plurality of containers including the reactive material are configured to fire simultaneously, sequentially or in a programmed pattern.

6. The device of claim 1, further comprising a timer coupled to the ignition control mechanism and configured to enable remote, time-delayed, predetermined or controlled firing of the remainder of the plurality of containers.

7. The device of claim 1, wherein the reactive material igniter is an electric match.

* * * * *